United States Patent
Handa et al.

(10) Patent No.: US 7,110,972 B1
(45) Date of Patent: Sep. 19, 2006

(54) METHOD AND SYSTEM OF MANAGING CREDIT FOR THE ELECTRONIC TRADING OF FINANCIAL INSTRUMENTS

(75) Inventors: Michiya Handa, New York, NY (US); Michael J. Tari, New York, NY (US); Darius Gagne, New York, NY (US); Neil Chriss, New York, NY (US); Jeffery Larsen, Greenwich, CT (US)

(73) Assignee: ICOR Brokerage, Inc., New York, NY (US)

( * ) Notice: Subject to any disclaimer, the term of this patent is extended or adjusted under 35 U.S.C. 154(b) by 24 days.

(21) Appl. No.: 09/665,305

(22) Filed: Sep. 19, 2000

(51) Int. Cl.
*G06Q 40/00* (2006.01)

(52) U.S. Cl. .......................................... 705/37; 705/35
(58) Field of Classification Search ................ 705/37, 705/1, 35; 364/408
See application file for complete search history.

(56) References Cited

U.S. PATENT DOCUMENTS

| | | | |
|---|---|---|---|
| 3,573,747 | A | 4/1971 | Adams et al. |
| 4,412,287 | A | 10/1983 | Braddock, III |
| 4,486,853 | A | 12/1984 | Parsons |
| 4,554,418 | A | 11/1985 | Toy |
| 4,674,044 | A | 6/1987 | Kalmus et al. |
| 4,677,552 | A | 6/1987 | Sibley, Jr. |
| 4,942,616 | A | 7/1990 | Linstroth et al. |
| 4,980,826 | A | 12/1990 | Wagner |
| 5,038,284 | A | 8/1991 | Kramer |
| 5,077,665 | A | 12/1991 | Silverman et al. |
| 5,101,353 | A | 3/1992 | Lupien et al. |
| 5,136,501 | A * | 8/1992 | Silverman .................. 364/408 |
| 5,214,579 | A | 5/1993 | Wolfberg et al. |
| 5,297,031 | A | 3/1994 | Gutterman et al. |
| 5,375,055 | A | 12/1994 | Togher et al. |
| 5,655,088 | A | 8/1997 | Midorikawa et al. |
| 5,689,652 | A | 11/1997 | Lupien et al. |
| 5,717,989 | A | 2/1998 | Tozzoli et al. |
| 5,724,524 | A | 3/1998 | Hunt et al. |
| 5,727,165 | A | 3/1998 | Ordish et al. |
| 5,774,880 | A | 6/1998 | Ginsberg |
| 5,802,499 | A | 9/1998 | Sampson et al. |
| 5,809,483 | A | 9/1998 | Broka et al. |
| 5,857,176 | A * | 1/1999 | Ginsberg ..................... 705/36 |

(Continued)

FOREIGN PATENT DOCUMENTS

EP      0411748 A2      2/1991

(Continued)

OTHER PUBLICATIONS

Schmerken, Ivy, *Banks Eye Forex Matching Systems*, Wall Street Computer Review, vol. 9, No. 2, p. 45.

(Continued)

*Primary Examiner*—Alain L. Bashore
(74) *Attorney, Agent, or Firm*—Skadden, Arps, Slate, Meagher & Flom LLP

(57) ABSTRACT

A method for tracking credit limits between a first financial institution and a second financial institution is disclosed. Each financial instrument may have one or more tenors. An initial credit limit is assigned to a credited financial institution for each tenor of each financial instrument to be traded. A relationship is assigned to each credit limits on a first plurality of tenors wherein credit extended on one of said tenors reduces the available credit on said other tenors, said credit being reduced in proportion to said preassigned proportions. When the system receives a signal associated with trades between counterparties, the system updates the credit limits between the counterparties in accordance with preassigned proportions.

37 Claims, 12 Drawing Sheets

U.S. PATENT DOCUMENTS

| | | | |
|---|---|---|---|
| 5,873,071 | A | 2/1999 | Ferstenberg et al. |
| 5,905,974 | A | 5/1999 | Fraser et al. |
| 5,905,975 | A | 5/1999 | Ausubel |
| 5,915,209 | A | 6/1999 | Lawrence |
| 5,924,082 | A | 7/1999 | Silverman et al. |
| 5,924,083 | A | 7/1999 | Silverman et al. |
| 5,950,177 | A | 9/1999 | Lupien et al. |
| 5,963,923 | A | 10/1999 | Garber |
| 5,983,200 | A | 11/1999 | Slotznick |
| 5,987,419 | A | 11/1999 | Hachino et al. |
| 6,012,046 | A | 1/2000 | Lupien et al. |
| 6,014,627 | A * | 1/2000 | Togher ........................ 705/1 |
| 6,014,643 | A | 1/2000 | Minton |
| 6,014,644 | A | 1/2000 | Erickson |
| 6,016,483 | A | 1/2000 | Rickard et al. |
| 6,026,383 | A | 2/2000 | Ausubel |
| 6,035,187 | A * | 3/2000 | Strobert ........................ 705/37 |
| 6,055,519 | A | 4/2000 | Kennedy et al. |
| 6,058,379 | A | 5/2000 | Odom et al. |
| 6,119,101 | A | 9/2000 | Peckover |
| 6,131,087 | A | 10/2000 | Luke et al. |
| 6,151,588 | A | 11/2000 | Tozzoli et al. |
| 6,317,727 | B1 * | 11/2001 | May ........................ 705/37 |
| 6,519,574 | B1 | 2/2003 | Wilton et al. |
| 2002/0002530 | A1 | 1/2002 | May |

FOREIGN PATENT DOCUMENTS

| | | |
|---|---|---|
| EP | 0512702 A2 | 11/1992 |
| EP | 0407026 B1 | 11/1995 |
| EP | 0399850 B1 | 12/1995 |
| WO | WO 99/19821 | 4/1999 |

OTHER PUBLICATIONS

Wilson, John F., *On-Line International Cash Management*, Annual ACM Conference, 1983.
Burman, Michael, *Aspects of a High-Volume Production Online Banking System*, IEEE Compcon, Spring of 1985.
Sammer, Harald W., *Online Stock Trading Systems: Study of an Application*, IEEE Compcon, Spring of 1987.
Clemons, E.K., et al., *Merrill Lynch Cash Management Account Financial Service: A Case Study in Strategic Information Systems*, 21st Annual Hawaii International Conference on Systems Sciences, vol. 4, 1988.
Finebaum, Murray L., *Information Systems in the Securities Industry*, 21st Annual Hawaii International Conference on System Sciences, vol. 4, 1988.
Sager, M.T., *Competitive Alliances With Information Technology—The Australian Retail Banking Experience*, 22nd Annual Hawaii International Conference on System Sciences, vol. 4, 1989.
Gutner, Tammi, *Fine If You're Big*, The Banker, Oct. 1988.
Arend, Mark, *Swift Speeds Up As Broker/Dealers Join*, Wall Street Computer Review, Jan. 1989.
Essinger, James, *ISE's 'SAEF' Debuts to Make the Market Sound*, Wall Street Computer Review, May 1989.
Freund, William C., *Electronic Trading and Linkages in International Equity Markets*, Financial Analysis Journal, May-Jun. 1989.
Schmerken, Ivy, *High-Tech Banks Set to Challenge Wall Street*, Wall Street Computer Review, Jul. 1989.
Arend, Mark, *Banks Lure Investors With High-Tech Convenience*, Wall Street Computer Review, Dec. 1989.
Arend, Mark, *Where Wall Street's Tending In Trading Systems Design*, Wall Street Computer, Jun. 1990.
Brennan, P.J., *OTC Trading Systems Lead In Race to Automate*, Wall Street Computer Review, Nov. 1990.
Cody, B.J., *Reducing the Costs and Risks of Trading Foreign Exchange*, Wall Street Computer Review, Nov. 1990.
Goodman, Ann, *The Monep: Mixing Men and Machines for Market Might*, Wall Street Computer Review, Aug. 1991.
Heyman, D.P., *A Performance Model of the Credit Manager Algorithm*, Computer Networks and ISDN Systems, Mar. 1992.
*Method For Collection of Accounting Data*, IBM Technical Disclosure Bulletin, 1986.
*Banks Look to Build FX Order- Matching System Quotron Eyed as Vendor, , Minex as Co-Sponsor?*, FX Week, May 17, 1991.
*TST Interviews Evan Schulman*, Automated Trading Pioneer, Trading Systems Technology, Jul. 15, 1991.
Schmerken, Ivy, *Staying in the Middle: . . . Brokers Are Fighting to Keep Their Role in the Market; Includes Related Article on Crossing Networks*, Wall Street Computer Review, Dec. 1991.
Jeffries, AZX, *Others Team With Buy-Side Sofware System*, Wall Street Letter, Jun. 8, 1992.
*Proprietary Execution: Minex Secures Asian Support for Order-Matching System*, Trading Systems Technology, Jan. 27, 1992.
*Proprietary Execution: Quotron, EBS Demo Prototype of Forex Order-Matching System*, Trading Systems Technology, Nov. 4, 1992.
*Eleven Banks, Quotron Unveil EBS Demo Anonymous Forex Order-Matching System*, FX Week, Nov. 1, 1991.
Keith, C., *The Overdue Revolution; Equity Trading in the Post-Electronic Age: A Working Plan for a Customer-Based System*, Investment Dealer's Digest, Sep. 30, 1991.
Fingelton, E., *Tokyo Takes on Reuters in the Race to Wire the Forex World*, International Japan Journal, p. 35, Dec. 1990.
Arend, M., *New Systems Lighten Load on Bank Securities Wings . . .* , Wall Street Computer Review, Nov. 1990.
*VAX-11 Version of "IBIS" Released by Tymshare*, Computer World, May 9, 1983.
Capitol Hill Hearing Testimony, Shawn A. Dorsch, Pres. & CEO of Derivatives Net, Inc., Senate Banking, Housing & Urban Affairs Changing Financial Markets, May 8, 2000.
Perkins, Fred J., *Nordex: Automated Trading for Nordic Equities*, Computers in the City '89, London, Nov. 1989.
Money Match: Functional Specification, Version 1, Aug. 1990.
LIFFE User manual: How the Market Works 3rd Edition—Feb. 2000.

* cited by examiner

FIGURE 6

METHOD AND SYSTEM OF MANAGING CREDIT FOR THE ELECTRONIC TRADING OF FINANCIAL INSTRUMENTS

FIELD OF THE INVENTION

This invention generally relates to computerized brokerage systems and more particularly, to the electronic trading of financial instruments between various counterparties having unilateral or bilateral credit relationships.

BACKGROUND

When financial instruments, such as those listed in Table 1, are traded, the credit worthiness of the opposing counterparty is important because obligations of one or both parties under such financial instruments may extend up to and beyond thirty years. Each of the parties may be exposed to risk based upon the ability of a counterparty to fulfill its obligations. The resulting credit exposure over the life of a contract is potentially an unknown amount. Therefore, trading parties have a significant interest in limiting credit exposure.

In a typical "conversational" trading desk scenario in which traders enter and act on orders over the telephone, a credit officer for each trading entity assigns credit lines for each potential counterparty. An intermediary broker is used to match bids and offers between various parties. Once two parties are matched, credit officers for both parties then determine whether to approve the transaction based on the opposing party's credit limit. Alternatively, the broker may maintain a list of which entities each party is willing to trade with, and only match parties who are cleared to deal with one another.

TABLE 1

F/X Products
    American and European Options
        Calls
        Puts
        Risk Reversals and Straddles
        Strangles
    Exotic Options
        Knock-ins/outs
        Reverse knock ins/outs
    Other Instruments
        Forwards
Fixed Incom Products
    Swaps
        Swap spreads (traded with treasury hedge)
        All-in rate swaps
        Spread switches
        All-in-rate switches
        1–3,3–6,1–6 month LIBOR basis swaps
        CP-3 month LIBOR basis swaps
    Forward Rate Agreements
        1/3/6 month LIBOR
        FRA Switches
    Swaptions
        European (payer, receiver, straddle)
        Bermudan (payer, receiver, straddle)
        Bermudan-European Switches (payer, receiver, straddle)
        LIBOR Cap/Floor, Straddle
        LIBOR Digital Cap/Floor
    Convexity Products
        Cap/Floor, Straddle (CMS/CMT 2, 5, 10, 30 year tenors)
        Rolling Spread Locks against a spot hedge
        Rolling Spread Locks quoted outright
Equity Index Products
    American and European Options
        Calls
        Puts
        Straddles A number of systems have been developed which attempt to automate the trading process and provide credit controls. For example, U.S. Pat. No. 6,014,627 describes an anonymous trading system which identifies the best bids and offers from those counterparties with which each party is eligible to trade. The system pre-screens each bid and offer for a particular type of financial instrument for compatibility with credit information to calculate a best price (the "dealable" price), for each entity dealing with the particular financial instrument.

U.S. Pat. No. 5,924,083 describes a distributed trading system for displaying a credit-filtered view of markets for financial instruments based upon credit limits entered by the trading parties. Each trading entity initially enters credit information which consists of the amount of credit that the trading entity is willing to extend to other trading entities for one or more types of trading instruments. Each trading entity may also create group credit limits by which the trading entity may limit the amount of credit it is willing to extend to a group of potential counterparties.

PCT Application, No. PCT/US98/21518 describes a credit preference method in an anonymous trading system for screening trades between entities. Three screening methods are described: a binary method in which each entity makes a yes or no determination as to whether or not it will deal with each potential counterparty; a line binary or time limit method in which each entity sets a maximum maturity of contracts for each potential counterparty; and a "complex" method in which each entity specifies a maximum amount it will trade with each counterparty for one or more "maturity bands." The system provides a "complex preference interface" through which a credit administrator for the trading entity can specify for each potential counterparty, the maximum exposure for each maturity band. For example, an entity could specify that for a given counterparty, it "will do up to $100 million out for 5 years, and then only $50 million out from thereafter out to 10 years, and nothing thereafter." In determining appropriate limits, the administrator use a measure of "risk equivalence" (RQ) which is calculated as a function of the potential exposure averaged over a series of time points, weighed by a discount factor.

Although the above systems disclose credit mechanisms for use with trading systems, no known prior art allows an administrator or other authorized user to easily relate credit limits for multiple tenors or instruments. Thus, there exists a need for a method and system of facilitating the use of related credit limits for use with trading systems.

SUMMARY OF THE INVENTION

These and other limitation of the prior art are addressed in the present invention which is a system and method of tracking credit limits between counterparties trading financial instruments on a trading system, where each financial instrument may have one or more tenors associated with it. Each trading party has a set of credit limits associated with each other potential trading party. This includes a credit limit for one or more tenors of each financial instrument to be traded. The tenors are grouped into sets of "buckets," where a single credit limit is applied to all tenors in an individual bucket. A relationship is associated with the credit limits for a first group of buckets wherein credit extended on one of the tenors in an individual bucket proportionally reduces the available credit for the other buckets, and therefore the credit limit on each tenor in the buckets. When a trade is entered into between a party and a given counterparty for a given tenor, the credit limit for the bucket associated with the tenor is reduced by the amount of the trade and the credit limits on the related buckets are proportionally reduced. In a preferred embodiment, the credit limit of each bucket is reduced in proportion to an initial assigned credit limit.

BRIEF DESCRIPTION OF THE DRAWINGS

FIG. 6 shows an exemplary user interface for setting eligibility as well as available credit multipliers for a plurality of counterparties in accordance with the present invention;

DETAILED DESCRIPTION OF THE INVENTION

Figure 1:
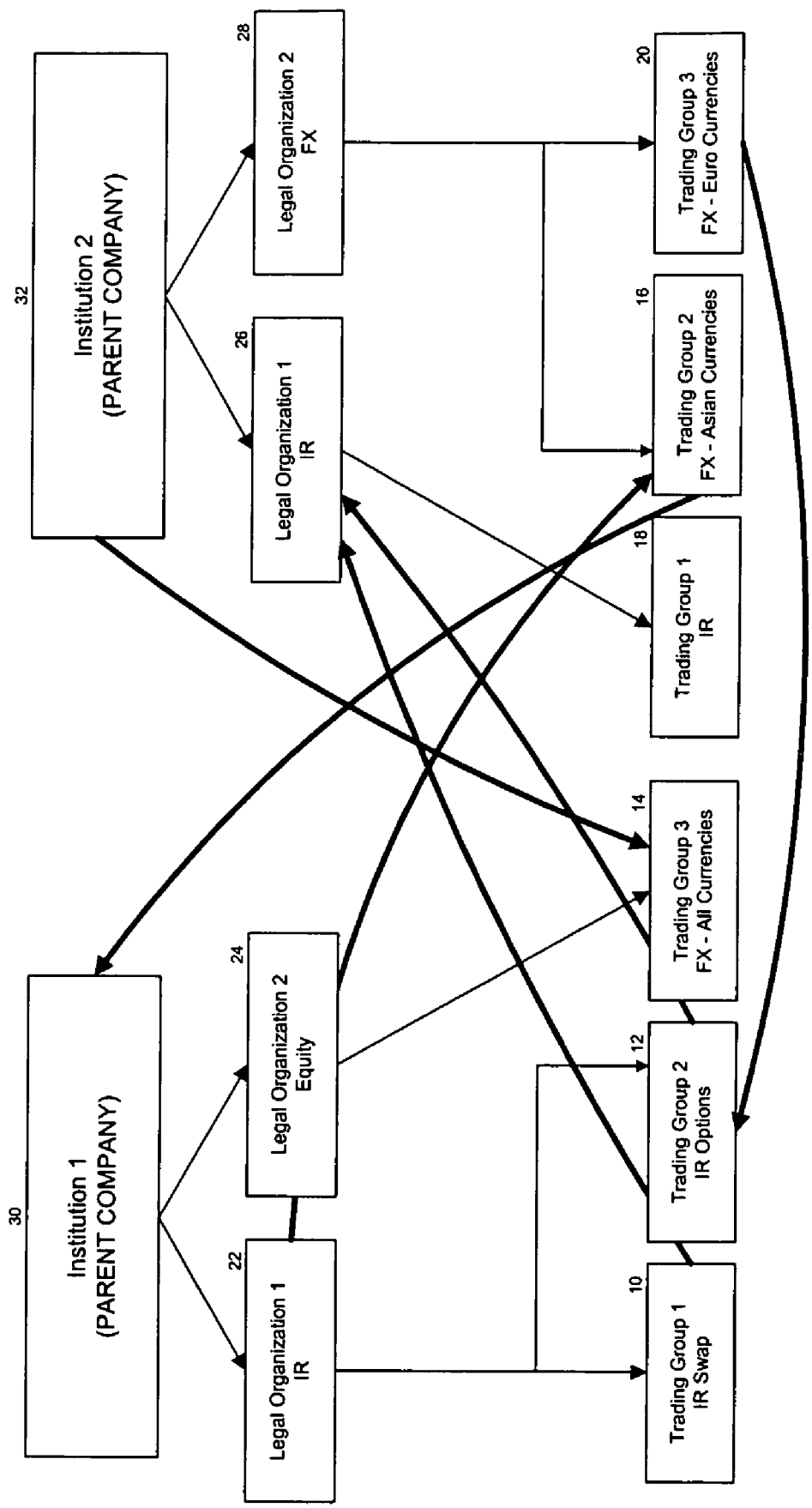
FIG. 1 is a schematic diagram of exemplary credit relationships formed between trading organizations in accordance with the present invention.

With reference to FIG. 1, a typical trading and credit scenario is described. Trades of financial instruments are typically performed between trading groups (10, 12, 14, 16, 18, 20). Each trading group typically trades one or more types of financial instruments. Each trading group also typically includes one or more individual traders. Credit relationships are typically established between trading groups and legal organizations (22, 24, 26 and 28). Alternatively, credit relationships may be formed between trading groups and parent companies of the legal organizations (shown as institutions 30, 32); or between any combination of trading groups, organizations, institutions, or other entity. Accordingly, the term "party" or "counterparty" shall refer to any institution, organization, trading group, or other entity which has a unilateral or bilateral credit relationship with another entity. In a typical scenario, a credit officer or someone with policy setting power for a party will define the amount of credit the party is willing to extend to each potential counterparty.

The invention is most suited to instruments that include on-going obligations, such as those listed in Table 1, but can also be applied to other instruments, such as stocks and bonds where a party's only significant risk is settlement. Moreover, the invention also applies to contracts based upon the exchange of any commodity, such as contracts for the exchange of bandwidth, real estate, electricity, processing power, freight transportation, etc. Thus the term "financial instruments" as used herein includes contracts based upon such commodities or services.

Figure 2:
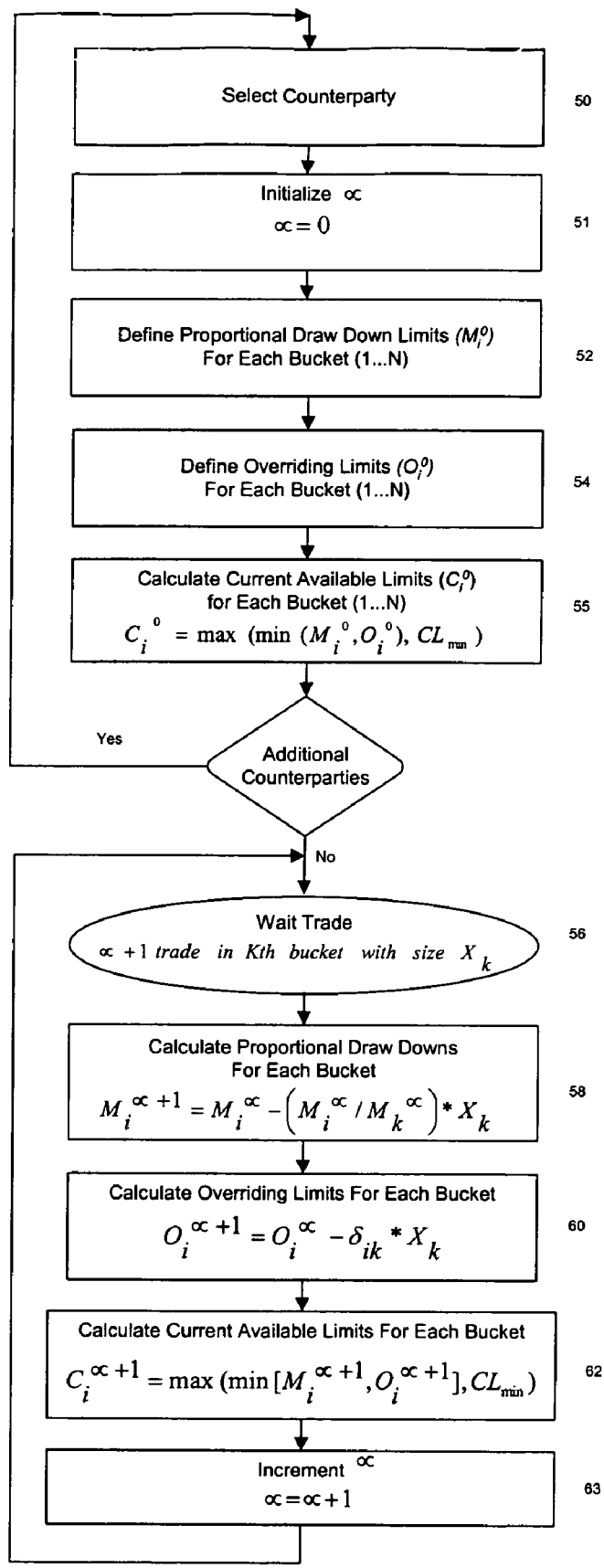
FIG. 2 is a flow chart of a preferred process for tracking credit limits in accordance with the invention.

With reference to FIG. 2, an overview of the system for entering and processing credit limits on buckets is described. For each potential counterparty (50), the system is initialized, i.e. $\alpha$ is set to zero (51), and the credit officer or other authorized user (referred to herein as an "administrator" or "credit officer") defines a Proportional Draw Down limit (52) for each bucket by tenor $M_i^0$ for buckets (i=1 ... N). The administrator may combine several tenors or financial instruments into a single bucket. Thus, for example, the administrator may choose to set up three buckets for a given financial instrument, such as a two year tenor, a five year tenor and a seven year tenor. Any tenor for this financial instrument would then be assigned to one of these buckets based on its lifespan. In a preferred embodiment, any tenor of the financial instrument of two years or less would be assigned to the two year bucket; any tenor of the financial instrument of greater than two years but less than or equal to five years would be assigned to the five year bucket; and any tenor of the financial instrument of greater than five years but less than or equal to seven years would be assigned to the seven year bucket. Any tenor of the financial instrument of greater than seven years could not be traded unless the administrator chose to create an additional bucket of a longer tenor. In an alternate embodiment, tenors of greater than the maximum bucket tenor are given a "maybe" trading status, as described further below. The administrator further decides how buckets are related. For example, all tenors of a given financial instrument are typically related. In addition, the administrator may also decide to group different financial instruments, such as swaps and options, together, such that credit drawn down for swaps will reduce the credit available for the options.

The Proportional Draw Down for each bucket represents the amount of trading that could potentially be done (on a notional basis) in a single bucket that would completely exhaust the entire credit limit of a given counterparty. Combined, the Proportional Draw Downs for a group of buckets give the proportional relationship between trades done in different buckets. In one embodiment of the invention, the administrator may further define an Overriding Credit Limit (54) for each bucket $O_i^0$ for buckets (i=1 ... N) which is an additional constraint on credit that further limits the trading in any bucket. The Overriding Credit Limit is the maximum that may be drawn down from a given bucket. The Current Available credit limit at any given time for each bucket is then the minimum of the Proportional Draw Down and the Overriding Credit Limit. In one embodiment, the administrator may further specify a minimum trade amount ($CL_{min}$) below which trades will be allowed. This may be a global variable or assigned individually for each entity. Optionally, this minimum is simply set to zero.

The Proportional Draw Downs create a relationship between the various buckets for the various instruments, such that the trading in any instrument in any single bucket will have an effect on all of the instruments in any related buckets. While the present invention is described in terms of Proportional Draw Downs, other methods of specifying the relationship between tenors of financial instruments are within the scope of the invention and will be apparent to those of skill in the art based on the specification herein. These alternate methods include, without limitation, specifying the fractional relationships between buckets. Thus, for example, one could specify a credit relationship between ten year, five year, and two year tenors, for a given option, as 1:4; 1:2; and 1:1. Once the administrator defines the Proportional Draw Downs, and, optionally, the Overriding Credit Limits, the system calculates (55) initial Currently Available Limits for each bucket $C_i^0$ for buckets (i=1 ... N). The initial Currently Available Limits are preferably calculated according to the formula:

$$C_i^0 = \max(\min[M_i^0, O_i^0], CL_{min}).$$

As shown in FIG. 2, after the Proportional Draw Down Limits and Overriding Limits are defined, and the initial Currently Available Limits are calculated, the system is ready to process trades (56). A preferred methodology utilizing the concept of Proportional Draw Downs along with Overriding Limits to track Current Available Limits is now described:

Suppose there are N Buckets: 1 ... N.

Suppose that there have been $\alpha$ ($\alpha=0, 1, 2, \ldots$) trades done so far.

Denote the values of the Proportional Draw Downs for the N buckets after $\alpha$ trades as $M_i^\alpha$, i=1 ... N, the values of the Overriding Limits as $O_i^\alpha$, i=1 ... N, and the values of the Current Available Limits as $C_i^\alpha$, i=1 ... N.

Suppose that the $\alpha+1$ trade is done (56) in the $k^{th}$ bucket with size $X_k$.

In one embodiment of the invention, both parties to a trade will draw down the credit limits available to the opposing party for any trade. In another embodiment, trades for certain types of instruments having non-symmetrical credit risks will only draw down against the credit limits for one of the parties. For example, the buyer of an option would want to reduce the credit limit of the party it is buying the option from, whereas the seller of an option may not want to reduce the credit limit of the party it is selling the option to. In this embodiment, the system will determine whether to reduce one or both parties respective credit limits based on the nature of the instrument and whether the party is a buyer or a seller.

The system calculates (58) (for at least one counterparty) new values for the Proportional Draw Downs as:

$$M_i^{\alpha+1} = M_i^\alpha - (M_i^\alpha/M_k^\alpha)*X_k. \quad (1)$$

The system calculates (60) (for at least one counterparty) new values for the Overriding Limits as:

$$O_i^{\alpha+1} = O_i^\alpha - \delta_{ik}*X_k. \quad (2)$$

where $\delta_{ik}$ is the well known Kronecker Delta and has a value equal to 0 if i is not equal to k and a value equal to 1 if i equals k.

The system calculates (62) (for at least one counterparty) new values for the Current Available Limits as:

$$C_i^{\alpha+1} = \max(\min[M_i^{\alpha+1}, O_i^{\alpha+1}], CL_{min}). \quad (3)$$

where max is the maximum function which compares the two arguments and returns their maximum, and min is the minimum function which compares its two arguments and returns their minimum.

As noted above, in one embodiment $CL_{min}$ is automatically set by the system to zero. This ensures that the counterparty's credit limit will never be less than zero. However, $CL_{min}$ may be changed by an authorized user. Finally, $\alpha$ is incremented (63)

For the case of a typical trading desk authorized to trade swaps and options the following examples will help to understand the invention. Assume the trading desk's credit officer has specified the values for Proportional Draw Downs and Overriding Limits as shown in the first two rows of Table 2 and Table 3 below.

Initially no trades have taken place (i.e. $\alpha=0$).

TABLE 2

| SWAPS | 2 Year ("bucket 1") | 5 Year ("bucket 2") | 10 Year ("bucket 3") |
|---|---|---|---|
| Proportional Draw Down ($MM) | 400 | 200 | 100 |
| Overriding Limit ($MM) | 300 | 100 | 80 |
| Current Available Limit ($MM) | 300 | 100 | 80 |

TABLE 3

| OPTIONS | 2 Year ("bucket 4") | 5 Year ("bucket 5") | 10 Year ("bucket 6") |
|---|---|---|---|
| Proportional Draw Down ($MM) | 800 | 400 | 200 |
| Overriding Limit ($MM) | 500 | 400 | 200 |
| Current Available Limit ($MM) | 500 | 400 | 200 |

If we let the two year bucket for Swaps be bucket 1; the five year bucket for Swaps be bucket 2; the 10 year bucket for Swaps be bucket 3; the two year bucket for Options be bucket 4; the five year bucket for Options be bucket 5; and the ten year bucket for Options be bucket 6; the values for Proportional Draw Downs, Overriding Limits, and Current Available Limits are as follows:

$$M_1^0=400, M_2^0=200, M_3^0=100, M_4^0=800, M_5^0=400, M_4^0=200;$$

$$O_1^0=300, O_2^0=100, O_3^0=80, O_4^0=500, O_5^0=400, O_4^0=200;$$

$$C_1^0=300, C_2^0=100, C_3^0=80, C_4^0=500, C_5^0=400, C_4^0=200.$$

Now assume a trade takes place consisting of $40 MM of 2 year Swaps. The value for the trade size is:

$$X_1=40.$$

The new values (i.e. the $\alpha+1$ values) for the Proportional Draw Downs, Overriding Limits, and Current Available Limits can then be calculated using equations (1), (2), and (3) respectively.

For example:

$$M_1^1=400-(400/400)*40=360;$$

$$O_1^1=300-1*40=260;$$

$$C_1^1=\max(\min(360,260),0)=260.$$

Tables 2 and 3 can then be updated with the new values as shown in Tables 4 and 5, respectively.

TABLE 4

| SWAPS | 2 Year | 5 Year | 10 Year |
|---|---|---|---|
| Proportional Draw Down ($MM) | 360 | 180 | 90 |
| Overriding Limit ($MM) | 260 | 100 | 80 |
| Current Available Limit ($MM) | 260 | 100 | 80 |

TABLE 5

| OPTIONS | 2 Year | 5 Year | 10 Year |
| --- | --- | --- | --- |
| Proportional Draw Down ($MM) | 720 | 360 | 180 |
| Overriding Limit ($MM) | 500 | 400 | 200 |
| Current Available Limit ($MM) | 500 | 360 | 180 |

In a more general embodiment of the invention, Overriding Limits are not required. In essence, this is a special case of the above methodology in that it is equivalent to setting the Overriding Limit to the Proportional Draw Down for each bucket. The mathematical model for this case is as follows:

Suppose there are N Buckets: 1 ... N.

Suppose that there have been $\alpha(\alpha=0, 1, 2, \ldots)$ trades done so far.

Denote the values of the Proportional Draw Downs for the N buckets as $M_i$, i=1 ... N.

Denote the values of the Current Available Limits after a trades as $C_i^\alpha$, i=1 ... N.

Suppose that the $\alpha+1$ trade is done in the $k^{th}$ bucket with size $X_k$.

The new values for the Current Available Limits are $$C_i^{\alpha+1} = \max [C_i^\alpha - (M_i/M_k)*X_k, CL_{min}]. \quad (4)$$

Equation (4) can be employed in a similar manner to equation (3) above to continually track available credit. As above, in one embodiment $CL_{min}$ is automatically set to zero, but may, alternatively, be administered as noted above.

In one embodiment of the invention, the system implements the above procedure by normalizing the credit limits in buckets 1 ... N to the credit limit for a single bucket, called a Normalized Total Credit (NTC). The buckets are typically normalized to the maximum tenor, for example, the swaps of Table 2 above would be normalized to $100 million ten year swaps.

Thus, for example the conversion ratios ($CR_i$) for the two, five, and ten year swaps of Table 2 could be expressed as: 0.25, 0.5, and 1, respectively, where NTC is the normalized total credit ($100 million) with respect to the ten year swap.

Figure 3:
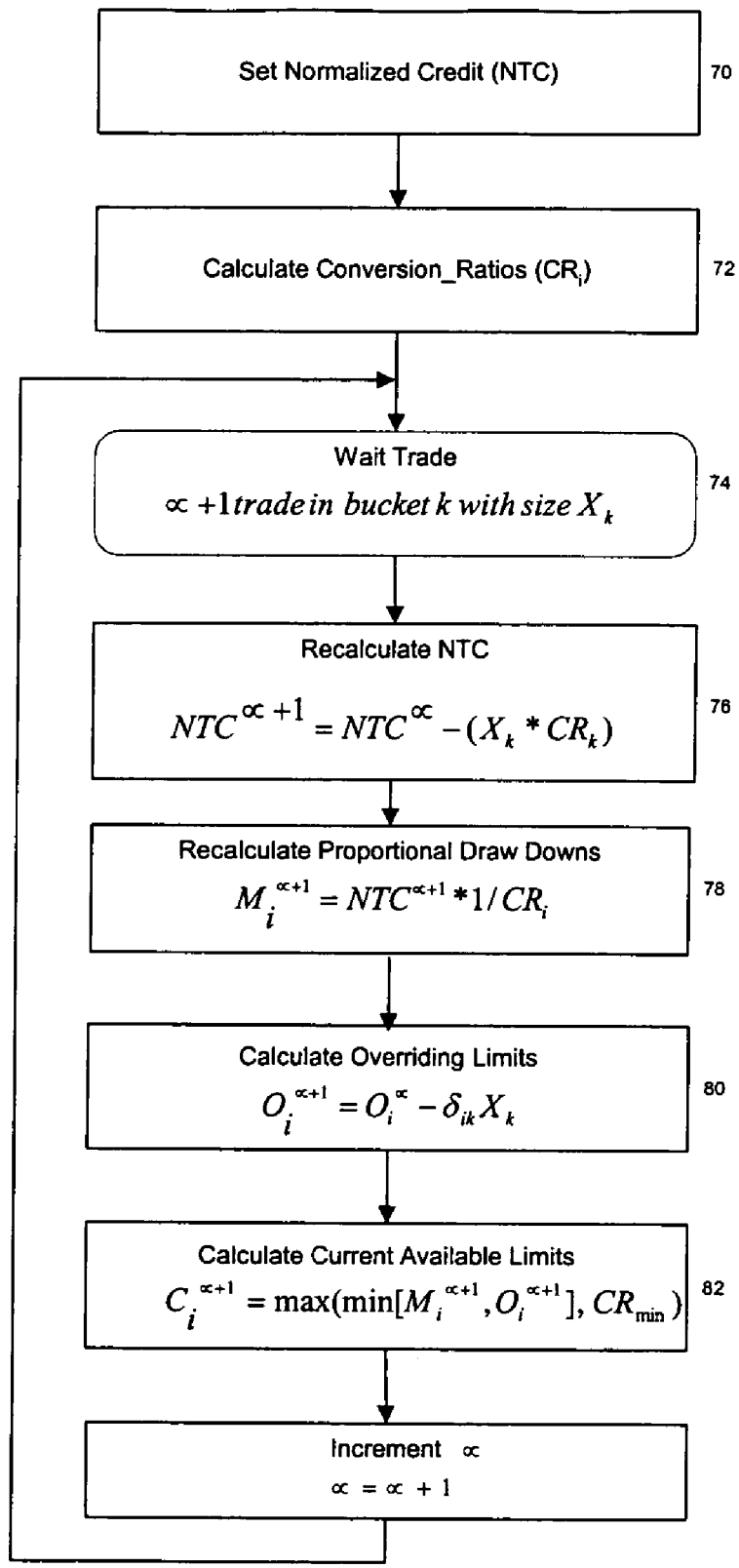
FIG. 3 is a flow chart of a method for calculating proportional draw downs and currently available limits in accordance with the present invention.
Figure 4:
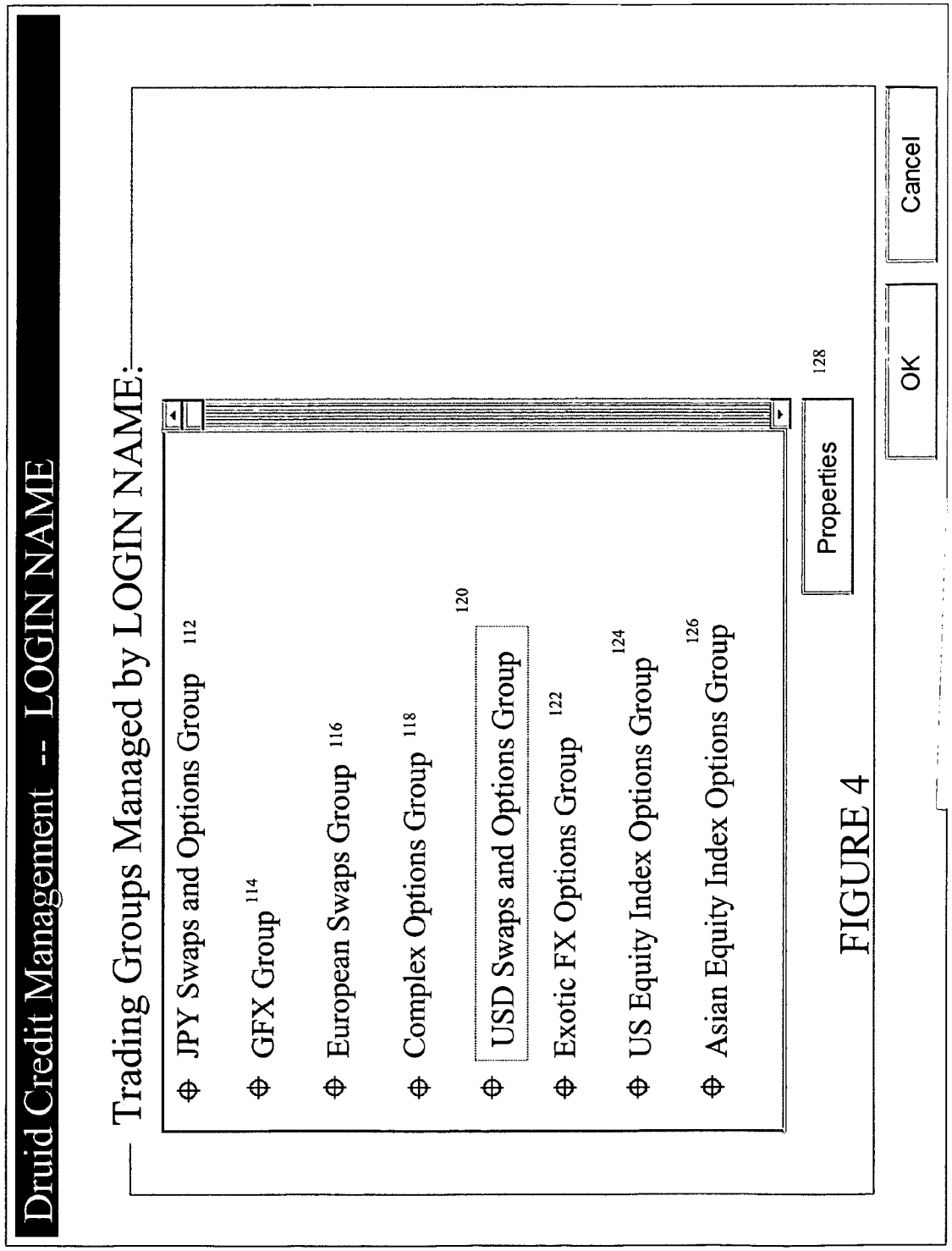
FIG. 4 shows an exemplary user interface for selecting trading groups in accordance with the present invention.

With reference to FIG. 3, a preferred method for calculating credit limits using NTC is now discussed. Once the Proportional Draw Downs and Overriding Credit Limits have been entered, the NTC must be set (70). As noted above, this is typically set equal to the Proportional Draw Down of the maximum tenor for at least one instrument, but may be set equal to any draw down limit or any arbitrary value. The conversion ratios ($CR_i$) are then calculated (72) for each bucket as the ratio of the NTC over credit limit for that bucket. When a signal indicating the $\alpha+1$ trade has occurred for a tenor falling in the $k^{th}$ bucket for amount $X_k$, is being entered into is received (74), the system recalculates (76) the NTC as:

$$NTC^{\alpha+1} = NTC^\alpha - (X_k * CR_i).$$

Proportional Draw Downs for each bucket ($M_i$) are calculated (78) as:

$$M_i^{\alpha+1} = NTC^{\alpha+1} * 1/CR_i.$$

Overriding Credit Limits ($O_i$) are calculated (80) as:

$$O_i^{\alpha+1} = O_i^{\alpha-1} - \delta_{ik} * X_k.$$

Current Available Limits ($C_i^\alpha$) are calculated (82) as:

$$C_i^{\alpha+1} = \max (\min[M_i^{\alpha+1}, O_j^{\alpha+1}], CL_{min}).$$

Continuing the example from Table 2 and 3 above, Tables 6 and 7 show initial Proportional Draw Downs of 400, 200, and 100 million, and Overriding Credit Limits of 300, 100, and 80 million for 2, 5 and 10 year swaps; and Proportional Draw Downs of 800, 400, and 200 million and Overriding Credit Limits of 500, 400, and 200 for 2, 5, and 10 year options, respectively.

TABLE 6

| SWAPS | 2 Year | 5 Year | 10 Year |
| --- | --- | --- | --- |
| Proportional Draw Down ($MM) | 400 | 200 | 100 |
| Conversion Ratio | CR:.25 | CR:.5 | CR:1 |
| Overriding Limit ($MM) | 300 | 100 | 80 |
| Current Available Limit ($MM) | 300 | 100 | 80 |

TABLE 7

| OPTIONS | 2 Year | 5 Year | 10 Year |
| --- | --- | --- | --- |
| Proportional Draw Down ($MM) | 800 | 400 | 200 |
| Conversion Ratio | CR:.125 | CR:.25 | CR:.5 |
| Overriding Credit Limit ($MM) | 500 | 400 | 200 |
| Current Available Limit ($MM) | 500 | 400 | 200 |

Assume forty million dollars of two year swaps, sixty-five million dollars of ten year swaps, as well as eighty million dollars of two year options are traded. NTC is calculated as follows:

$$NTC=100-(40\times0.25)-(65\times1)-(80\times0.125)=15.$$

The new available limits, as shown in Tables 8 and 9 are calculated being 30 for the five year swaps or 2 times the ten year NTC, 60 for the two year swap or 4 times the ten year NTC, and the new values for the options are 2 times the ten year NTC or 30 for the ten year options, the five year options maximum is 60 or 4 times the ten year NTC, and the new two year options limit is 8 times the ten year NTC or 120. Had any of the overriding credit limits been less than the calculated available limits, those values would have been used. Also, tables 8 and 9 have been updated to reflect updated Overriding Credit Limits.

TABLE 8

| SWAPS | 2 Year | 5 Year | 10 Year |
| --- | --- | --- | --- |
| Proportional Draw Down ($MM) | 60 | 30 | 15 |
| Overriding Credit Limit ($MM) | 260 | 100 | 15 |
| Current Available Limit ($MM) | 60 | 30 | 15 |

TABLE 9

| OPTIONS | 2 Year | 5 Year | 10 Year |
| --- | --- | --- | --- |
| Proportional Draw Down ($MM) | 120 | 60 | 30 |
| Overriding Credit Limit ($MM) | 420 | 400 | 200 |
| Current Available Limit ($MM) | 120 | 60 | 30 |

With reference to FIGS. 4–9, a preferred interface for managing credit limits will now be described. The credit officer, administrator, or other authorized user selects from a list of trading groups (shown as 112, 114, 116, 118, 120, 122, 124 and 126). The credit officer will select one or more of these trading groups and set trading properties for the selected group or groups. The credit officer enters the properties screen by selecting the properties link (128).

Overriding Credit Limits may be specified using a similar interface (not shown) for embodiments including overriding credit limits.

Figure 5A:
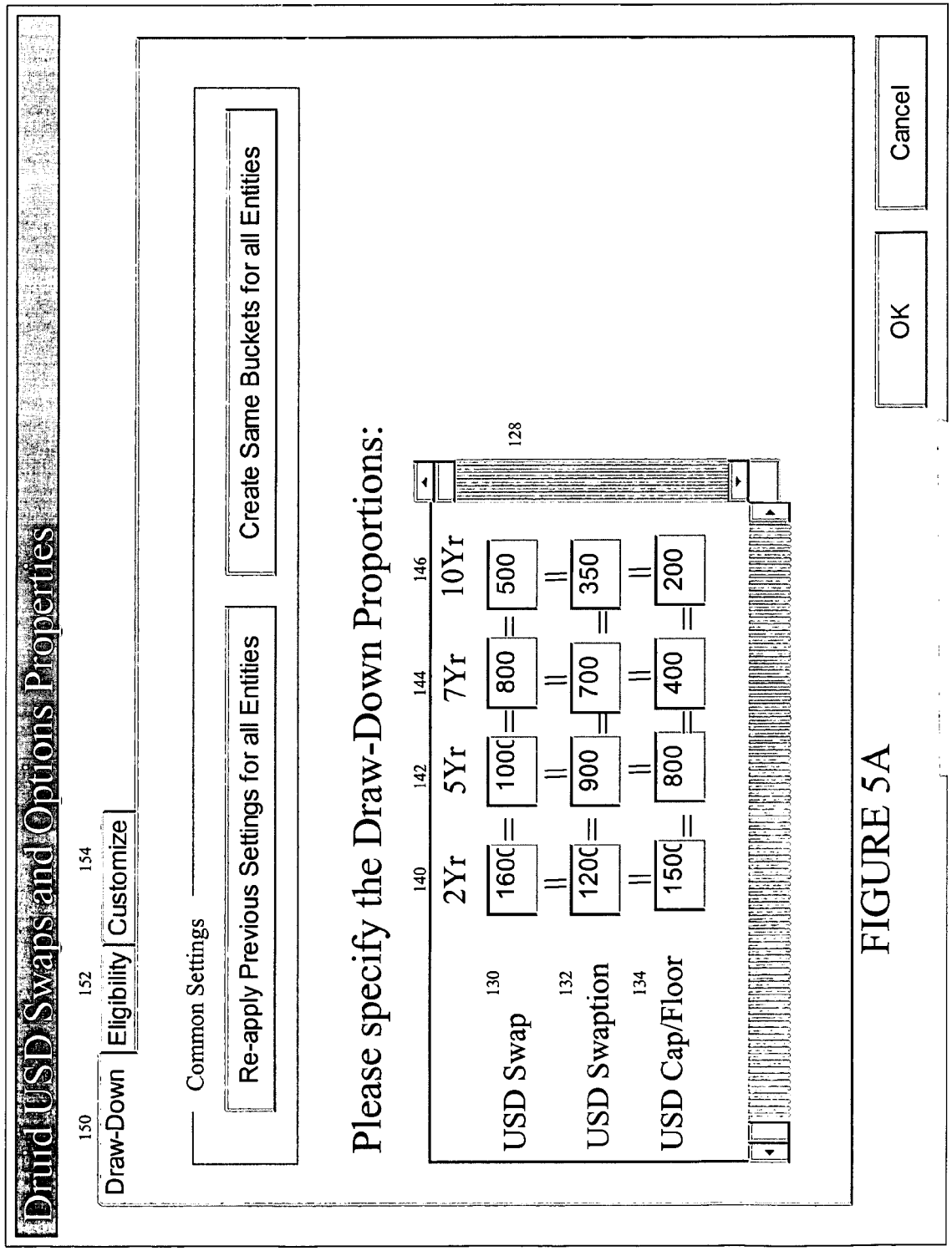
FIGS. 5A and 5B show an exemplary user interface for specifying draw down proportions for various tenors for financial instruments in accordance with the present invention.
Figure 8:
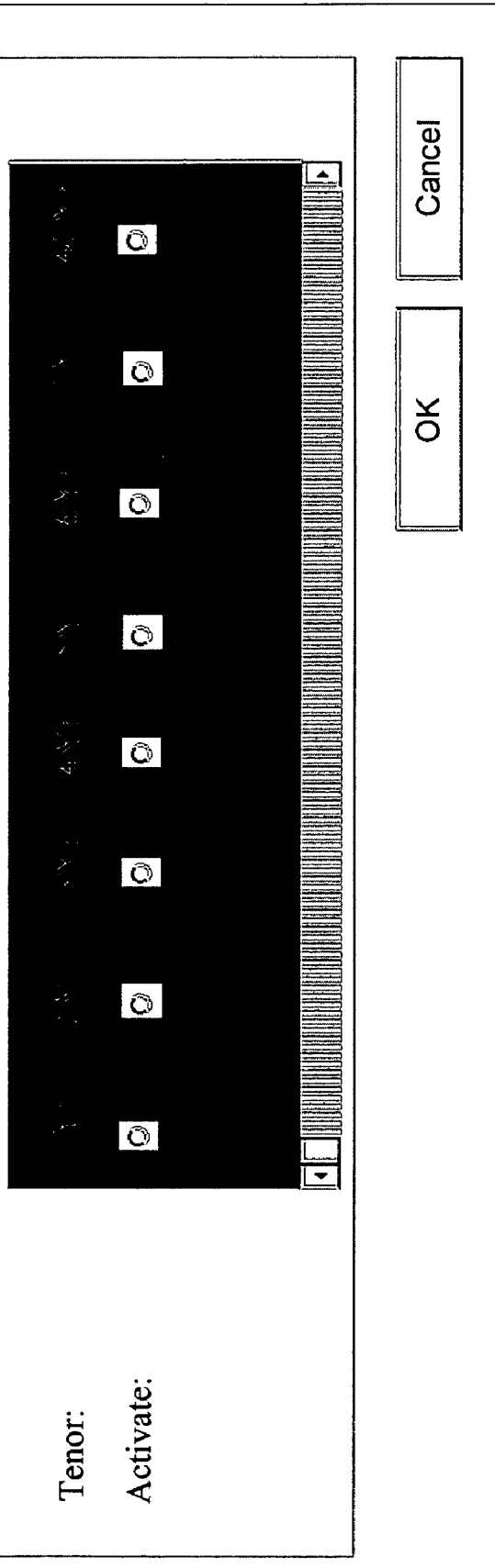
FIG. 8 shows an exemplary user interface for globally selecting buckets of financial instruments.
Figure 9:
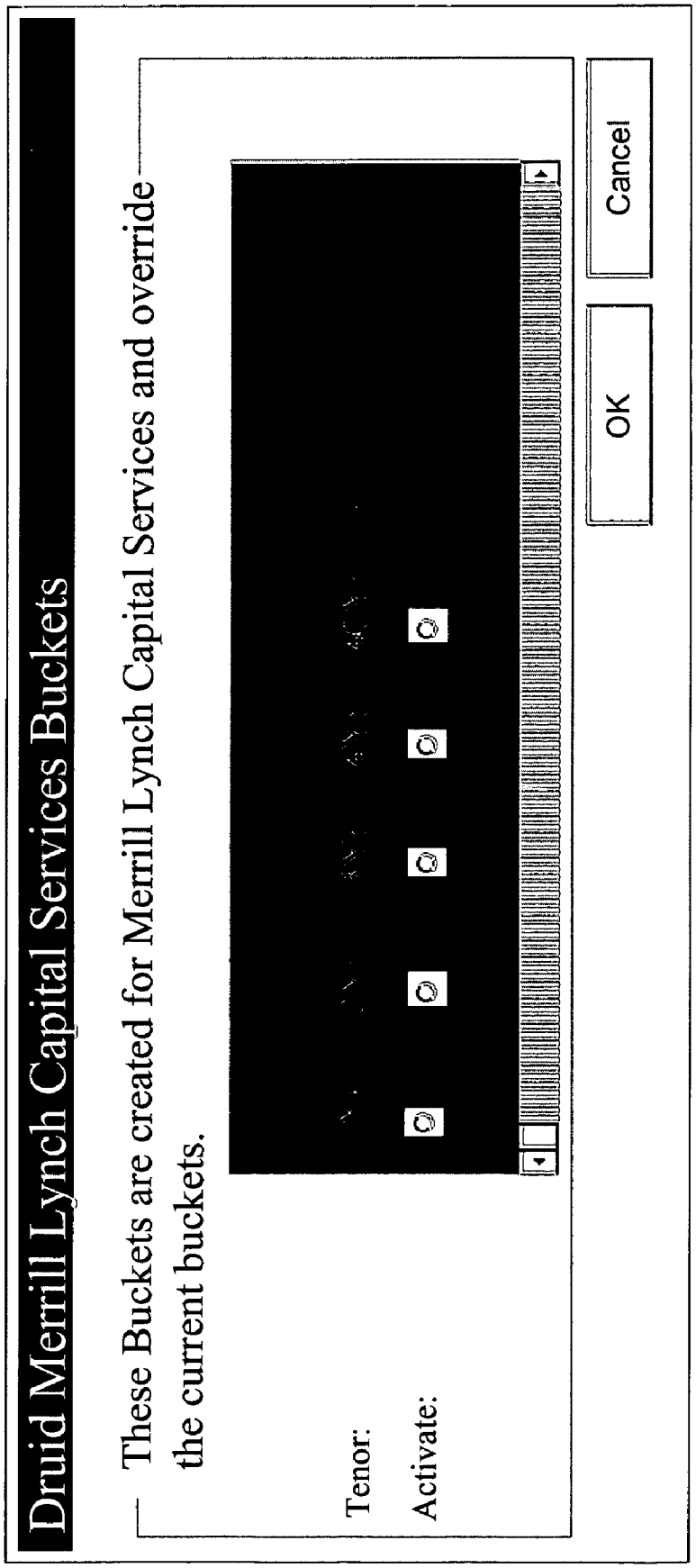
FIG. 9 shows an exemplary user interface for setting buckets for an individual institution.

FIG. 5A shows a draw down proportion screen (tab 150), including a draw down matrix (128), having three instruments, swaps (130), swaptions (132) and cap/floors (134). Additional instruments traded by the specific trading group, in this example, the USD Swaps and Options group, may be available by scrolling down the screen (not shown). In this example, four buckets for each instrument are displayed, two year (140), five year (142), seven year (144) and ten year (146). As noted above, each tenor for any listed instrument will be assigned by the system to one of the buckets for that instrument. The credit officer will enter the Proportional Draw Downs for each bucket for each instrument. For example, in FIG. 5A, the officer has entered 1600 for two year swaps, 1000 for five year swaps, etc. As shown in FIGS. 8 and 9, the credit officer can redefine the number, and tenor, of buckets, either globally (FIG. 8) or on an individual trading group (FIG. 9) basis.

Figure 5B:
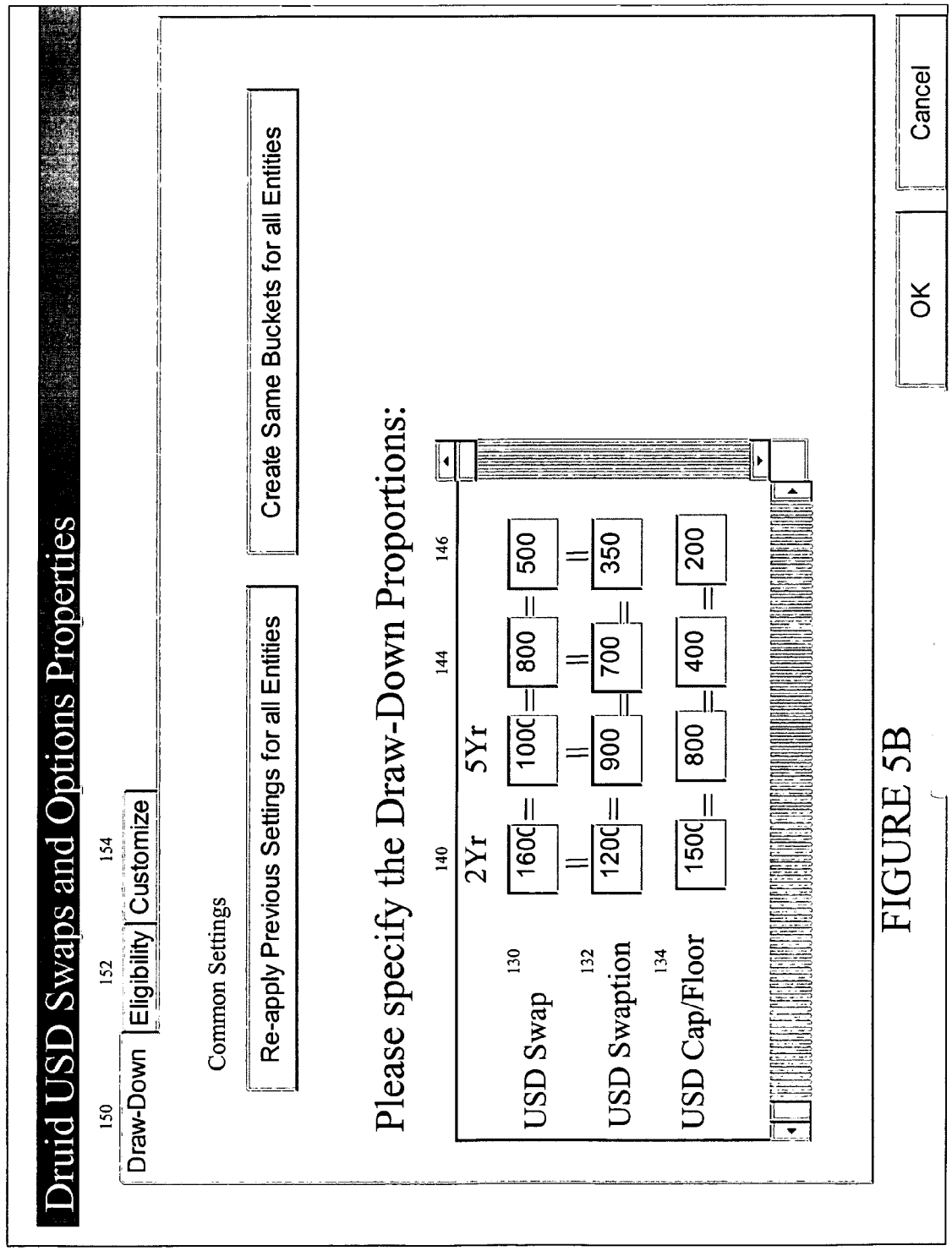

As shown by the horizontal and vertical "=" symbols in the draw down matrix (128), the Proportional Draw Downs for each tenor (140, 142, 144 and 146) of the instruments (130, 132 and 134) will be related. Thus, 500 in ten year swaps will be equivalent in draw down of credit to 1500 in two year cap/floors. As shown in FIG. 5B, in one embodiment, the credit administrator may specify that certain instruments and/or tenors are not related, by turning off the horizontal and/or vertical "=" symbols. For example, in FIG. 5B, the credit administrator has created two sets of buckets, one for USD swaps and USD swaptions, and a second for USD Cap/Floor. Thus, trading in the USD Cap/Floor instruments will not effect credit levels in the USD swaps and USD swaptions set of buckets. Likewise, trading in USD swaps or USD swaptions will not effect the credit levels in the USD Cap/Floor buckets.

Any instrument with a tenor not falling within a specific bucket will preferably be automatically grouped to the next higher bucket. Thus, for the example shown in FIG. 5A, trading a six year swap will be the same as trading a seven year swap for credit purposes. In another embodiment, any instrument with a tenor not falling within a bucket will be allocated among the next higher and next lower buckets by mathematical interpolation. For the example shown in FIG. 5A, a trade in a six year swap in this embodiment may have one half of its notational size drawn down from the five year bucket and one half drawn down to the seven year bucket.

Figure 6:
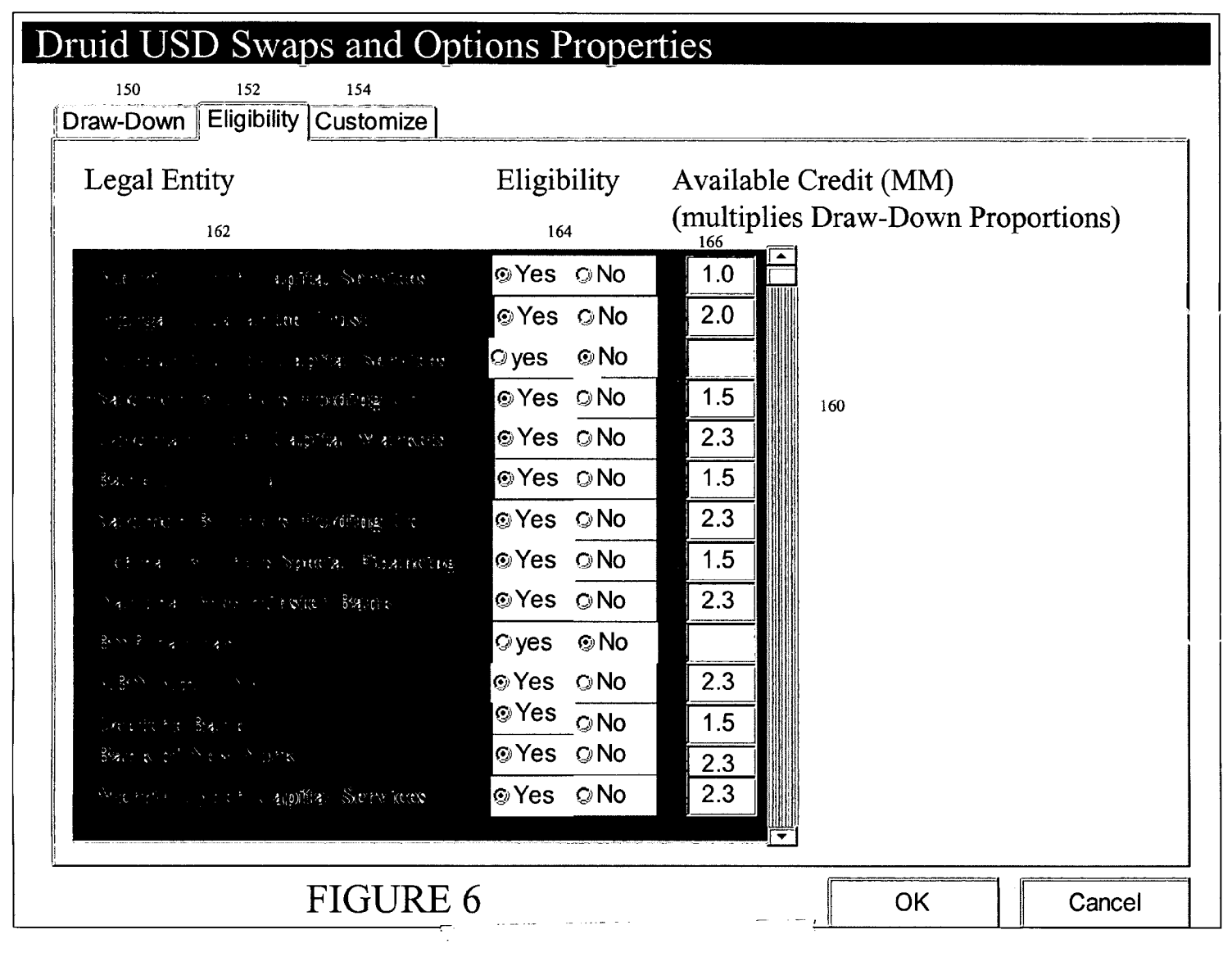

FIG. 6 shows an eligibility screen (tab 152), including an eligibility matrix (160), having a list of eligible entities (162), a binary eligibility list (164) and a draw down multiple (166). A trading group profile specifies which entities will be included in the eligible institution list (162). The first time the credit officer accesses the eligibility screen (tab 152), eligibility is defaulted to yes for all entities in the eligible institution list and the multiplier (166) is defaulted to 1.0. Any entities not included in the list will be assumed to be eligible, although their multiplier will be set to zero. Thus, as described below, new institutions will be given "maybe" status until the administrator further specifies credit status for that institution. The credit officer may modify eligibility for any specific institution by clicking on the binary eligibility list (164). The draw down multiple list allows the credit officer to easily multiply the drawn down matrix (128) set above in FIG. 5A by a multiplication factor. For example, Morgan Guarantee Trust has been assigned a multiple of 2.0 in FIG. 6. The system would then multiply each entry in the draw down matrix (128) of FIG. 5A by a factor of 2.0. For example, the two, five, seven and ten year limits for USD Swaps for Morgan Guarantee Trust would be set to 3200, 2000, 1600 and 1000 for two, five, seven and ten year buckets, respectively.

Figure 7:
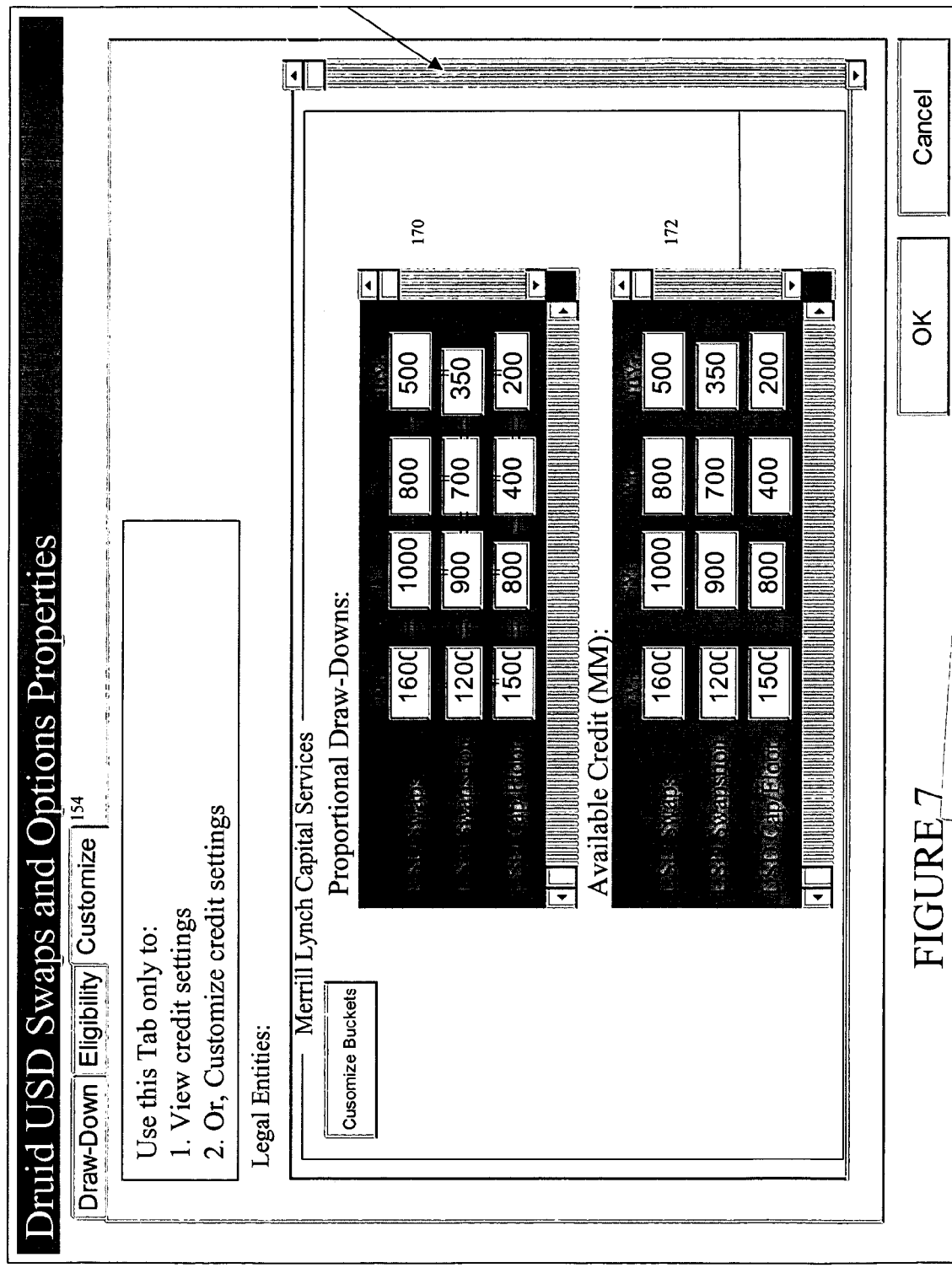
FIG. 7 shows an exemplary user interface for customizing proportional draw downs for individual institutions.

FIG. 7 shows a customization screen (tab 154), including a customizable draw down matrix (170) and an available credit limit matrix (172) for each trading institution. The credit officer may individually set the draw down limits for each bucket and instrument for each trading institution. The screen allows the credit officer to scroll down to additional trading entities. Users without credit setting power may view this screen to see the available credit limits for each institution, but preferably, are not allowed to modify credit limits.

Figure 10:
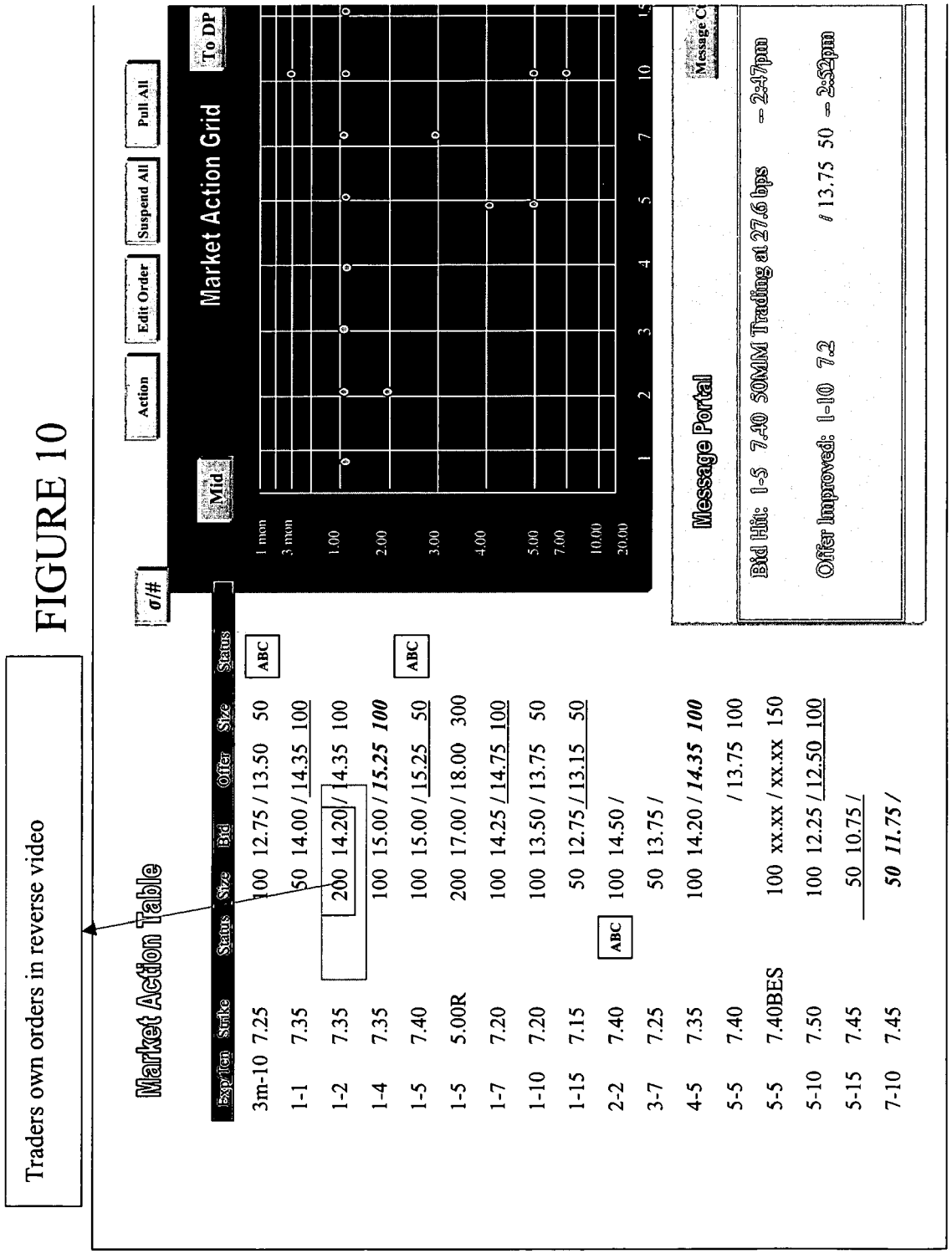
FIG. 10 shows an exemplary trader screen including credit relationship status information for each bid and offer.

As shown in FIG. 10, credit relationships in accordance with the present invention may be displayed on trader screens such that the credit relationship for individual trades may be displayed while keeping the identity of the potential trading counterparty anonymous. In a preferred embodiment, individual bids and offers are displayed with an indication, preferably specific colors, corresponding to the potential credit relationship of the counterparty. Bids and offers on which credit is bilaterally approved according to the credit relationship scheme are indicated by a first color, preferably green (shown as standard font text in FIG. 10). Bids and offers having a "maybe" status as to credit are indicated by a second color, preferably yellow (shown as underlined text in FIG. 10). A bid or offer will have a "maybe" status when credit was initially assigned by either party to the potential counterparty but has been used up, at least for the specific tenor, through one or more trades. These are considered "maybe" in the preferred embodiment because credit officers typically spread credit over a variety of systems and are often willing to further extend credit on one or more systems to a specific counterparty, particularly when the credit for the given counterparty has been used up on one system but not another. Alternately, "maybe" status for a potential counterparty would arise where the initial proportional draw downs or overriding credit limits have been set to zero. Bids and offers in which one or both parties have a "no" status are indicated with a third color, preferably red (shown as bold/italic in FIG. 10). This occurs when the credit officer for either party indicates they will not trade with the entity associated with the bid and/or offer. Traders using this system will immediately know the credit status, "yes," "no," or "maybe," of any bid or offer on the system before attempting to enter into a trade.

Figure 11:
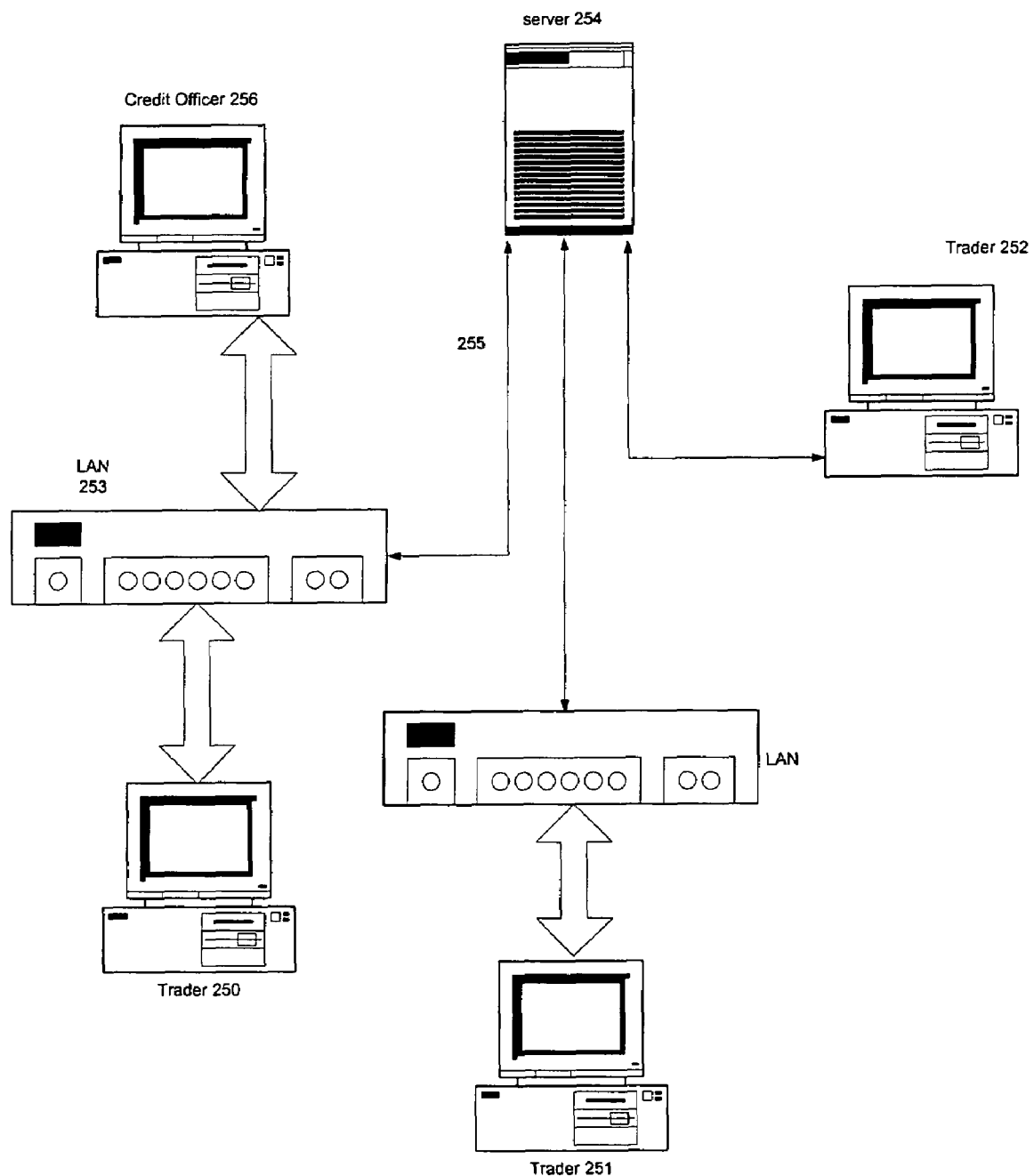
FIG. 11 is a schematic of an exemplary computer network implementing the disclosed invention.

The system is preferably implemented utilizing a computer network as disclosed in FIG. 11. Each trader station (250, 251 and 252) is connected to the server (254) through the network (255). The network (255) is preferably a private network connected through any number of means, such as T1 lines, digital subscriber lines, cable modems, satellite links, or other available connection means. One or more trader stations for a trade group may be coupled via a local area network (253). A credit officer station (256) also is preferably coupled via the same local area network (253) to server (254). Alternatively, trader stations (250, 251 and 252) may be coupled to server (254) through any of a number of means, such as via a public network such as the Internet or via a virtual private network. The system preferably utilizes a client-server architecture in which trader stations (250, 251 and 252) execute a thin-client written in Java to communicate with the server (254). In an alternate embodiment, the server (254) acts as a web server and communicates with trader stations (250, 251 and 252) using a page description language, such as HTML. In this embodiment, traders interact with server (254) using an HTML compatible browser (e.g., Netscape Navigator® or Microsoft Internet Explorer®).

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to claims that follow.

What is claimed is:

1. A method, with the aid of a computer system, of tracking credit limits for a plurality of tenors of one or more financial instruments, each said tenor associated with one of a plurality of buckets, said method comprising:

receiving at said computer system a proportional draw down amount associated with each of said buckets;

receiving at said computer system a signal associated with a trade action, said signal including a trade tenor and a trade amount; and using said computer system to recalculate said proportional draw down amount for each said bucket by implementing a function expressed as $$M_i^{\alpha+1} = M_i^\alpha - (M_i^\alpha/M_k^\alpha) * X_k,$$

where $M_i^{\alpha+1}$ denotes the value of the proportional draw down for bucket i after $\alpha+1$ trades, and $X_k$ denotes the size of the trade for bucket k.

2. The method of claim 1 further comprising:
defining an overriding credit limit for each said bucket.

3. The method of claim 2 further comprising:
using said computer system to recalculate said overriding credit limit for each bucket as a function of said trade amount and said trade tenor.

4. The method of claim 3 further comprising:
using said computer system to calculate a current available limit for each bucket.

5. The method of claim 4 wherein said recalculation of said overriding limits comprises:
implementing a function expressed as $$O_i^{\alpha+1} = O_i^\alpha - \delta_{ik} * X_k,$$

where $O_i^{\alpha+1}$ denotes the value of the overriding limit for bucket i after $\alpha+1$ trades, and $\delta_{ik}$ is the Kronecker Delta function and has a value equal to 0 if i is not equal to k and a value equal to 1 if i equals k.

6. The method of claim 5 wherein
said calculation of said current available limits comprises:
implementing a function expressed as $$C_i^{\alpha+1} = \max(\min[M_i^{\alpha+1}, O_i^{\alpha+1}], CL_{min})$$

where $C_i^{\alpha+1}$ is the current available limit for bucket i after $\alpha+1$ trades, $CL_{min}$ is a minimum trade amount below which trades will be allowed and max is the maximum function and min is the minimum function.

7. The method of claim 6 wherein $CL_{min}$ is zero.

8. The method of claim 1 further comprising:
using said computer system to calculate a current available limit for each bucket.

9. The method of claim 8 wherein
said calculation of said current available limit comprises:
implementing a function expressed as $$C_i^{\alpha+1} = \max[C_i^\alpha - (M_i/M_k) * X_k, CL_{min}]$$

where $C_i^{\alpha+1}$ is the current available limit for bucket i after $\alpha+1$ trades, $CL_{min}$ is a minimum trade amount below which trades will be allowed and max is the maximum function and min is the minimum function.

10. The method of claim 8 further comprising:
using computer system to determine whether said trade amount associated with said trade signal is greater than said current available limit for said bucket associated with said trade tenor, said trade associated with said trade signal is not allowed if said trade amount is greater than said current available limit for said bucket associated with said trade tenor.

11. The method of claim 10 further comprising:
using computer system to display an indication if said trade amount is greater than said current available limit.

12. A method, with the aid of a computer system, of tracking credit limits for a plurality of tenors of one or more financial instruments, each said tenor associated with one of a plurality of buckets, said method comprising:

receiving at said computer system a proportional draw down amount associated with each of said plurality of buckets, said received proportional draw down amount associated with each said bucket defining an initial proportional draw down ($M_i^0$) for each of i=1 . . . N buckets;

setting a normalized total credit (NTC) based on said initial proportional draw down for at least one said bucket;

using said computer system to calculate a conversion ratio $CR_i$ to said NTC for each said bucket (i);

using said computer system to recalculate NTC according to the function $$NTC^{\alpha+1} = NTC^\alpha - (X_k * CR_i),$$

where $NTC^{\alpha+1}$ is the NTC value after $\alpha+1$ trades, $X_k$ is the size of the $\alpha +1$ trade and $CR_i$ is the conversion ratio for bucket i; and using said computer system to recalculate said proportional draw down for each said bucket according to the function $$M_i^{\alpha+1} = NTC^{\alpha+1} * 1/CR_i$$

where $M_i^{\alpha+1}$ denotes the value of the proportional draw down for bucket i after $\alpha+1$ trades.

13. The method of claim 1 wherein said credit limits are tracked for a plurality of parties, said method further comprising:

using said computer system to identify, for each party, a set of counterparties said party may potentially trade with, each said counterparty having at least one plurality of buckets associated with it.

14. The method of claim 13 wherein at least one party identifies a counterparty having at least a first plurality of buckets associated with a first financial instrument which said party may trade with said counterparty, said counterparty further having a second plurality of buckets associated with a second financial instrument which said party may trade with said counterparty, said method further comprising:

receiving a signal at said computer from said party assigning a first proportional draw amount for each of said first plurality of buckets, and receiving a signal at said computer from said party further assigning a second proportional draw down amount for each of said second plurality of buckets.

15. The method of claim 14 in which said first proportional draw down amounts associated with said first plurality of buckets are unrelated to said second proportional draw down amounts associated with said second plurality of buckets.

16. The method of claim 13 in which at least one said party has a plurality of trading groups associated with it, said association stored on a database in said computer system.

17. The method of claim 16 in which at least one said trading group has a set of counterparties associated with said trading group, said association stored on a database in said computer system.

18. The method of claim 1 wherein said financial instruments are selected from the group consisting of stocks, contracts based on the exchange of commodities, bonds, and derivative instructs.

19. The method of claim 1 wherein said financial instruments are selected from the group consisting of foreign exchange products, fixed income products, and equity products.

20. The method of claim 18 wherein said derivative instruments are selected from the group consisting of American options, European options, exotic options, forwards, swaps, forward rate agreements, swaptions, and convexity products.

21. The method of claim 6 wherein the computer system receives a signal indicating $CL_{min}$ is assigned globally by a party to a plurality of potential counterparties.

22. The method of claim 6 wherein the computer system receives a plurality of signals indicating $CL_{min}$ is assigned individually by a party to each of a plurality of potential counterparties.

23. The method of claim 1 wherein said buckets 1 through N define a first proportional draw down relationship for credit extended by a buyer to a seller, said signal further includes an identification of a type of financial instrument associated with said trade;

said method further comprising:
receiving at said computer system a proportional draw down amount for a second plurality of buckets, said second plurality of buckets defining a second proportional draw down relationship for credit extended by said seller to said buyer;
determining by said computer system whether to recalculate said first proportional draw down relationship for credit extended by said buyer to said seller based on said type of financial instrument; and
determining by said computer system whether to recalculate said second proportional draw down relationship for credit extended by said seller to said buyer based on said type of financial instrument,
wherein trades for certain types of financial instruments will only effect said first or second proportional draw down relationships based on the type of instrument and whether the party is a buyer or seller.

24. The method of claim 23 wherein each said bucket is associated with a current available credit limit, said method further comprising:
if said first proportional draw down relationship is recalculated, said computer system recalculating said current available credit limit for each said bucket in said first set of buckets; and
if said second proportional draw down relationship is recalculated, said computer system recalculating said current available credit limit for each said bucket in said second set of buckets.

25. The method of claim 24 wherein each said bucket is associated with an overriding credit limit, said method further comprising:

if said first proportional draw down relationship is recalculated, said computer system recalculating said overriding credit limit for each said bucket in said first set of buckets; and
if said second proportional draw down relationship is recalculated, said computer system recalculating said overriding credit limit for each said bucket in said second set of buckets.

26. The method of claim 1 wherein said buckets are identified with a bucket tenor, each said trade being associated with a bucket having a bucket tenor greater than or equal to said trade tenor.

27. The method of claim 1 wherein said buckets are identified with a bucket tenor, each said trade being associated with a first bucket and a second bucket based on interpolation.

28. A method of trading of financial instruments between a party and a plurality of institutions comprising:
receiving at a computer system a first signal identifying a plurality institutions to trade with;
receiving at a computer system a second signal identifying a plurality of buckets (designated as $bucket_i$ for i=1 to N buckets);
receiving at a computer system a third signal identifying a set of financial instruments to be traded, each said financial instrument having at least one tenor, each said bucket associated with a range of tenors;
for each said bucket, receiving at a computer system an initial available credit limit associated with each said bucket,
assigning a relationship to said available credit limits associated with said buckets, wherein credit extended on in connection with a trade action associated with a trade amount and a financial instrument having a tenor falling within said range of tenors for one of said buckets (the $k^{th}$ bucket) reduces said available credit in $bucket_i$ for i=1 to N in proportion to said trade amount multiplied by said initial available credit limit associated with buckets divided by said initial available credit limit associated with said $k^{th}$ bucket;
receiving at a computer system a fourth signal associated with a trade action, said signal including a type of financial instrument, a trade tenor and an amount; and
in response to said trade signal, said computer system recalculating said available credit limit for each said bucket based on said relationship of said credit limits.

29. An apparatus for tracking credit limits among at least a first trading entity and a second trading entity, said trading entities trading a plurality of tenors of one or more financial instruments, comprising:
at least one media storing a database, said database storing:
a first structure associated with said first trading entity representing a plurality of buckets (designated as $bucket_j$ for i=1 to N buckets), each bucket associated with a range of tenors of said one or more financial instruments, each said bucket associated with an available initial credit limit;
a second structure associated with current available limit for each said bucket; and
an interface adapted to receive a signal from a trading system, said signal associated with a trade action, said signal including a first party, a second party, a trade financial instrument, a trade tenor and a trade amount;
a server coupled to said interface and said database, said server adapted to:

receive said trade signal;

associate said trade signal with a bucket (the $k^{th}$ bucket); and for each bucket$_i$ for i=1 to N reducing said currently available credit limit in proportion to said trade amount multiplied by said initial available credit limit associated with bucket$_i$ divided by said initial available credit limit associated with said $k^{th}$ bucket.

30. The apparatus of claim 29 further comprising:

a computer system adapted to produce a display associated with a trading entity, said display including a plurality of bids and offers, each bid and offer associated with a potential counterparty, a financial instrument and a tenor, said display further indicating the credit status between said trading entity and said potential counterparty for each said bid and offer, said credit status based on said tenor, trade amount and said available credit limits associated with said potential counterpart for each said bid and offer.

31. The apparatus of claim 29 wherein said server is further adapted to receive signals associated with bids and offers, each bid and offer associated with a potential counterparty, a financial instrument and a tenor, said server generating a signal indicating the credit status between said trading entity and said potential counterparty for each said bid and offer, said credit status based on said tenor, trade amount and said available credit limits associated with said potential counterpart for each said bid and offer.

32. A method, with the aid of a computer system, of tracking credit limits for a plurality of tenors of one or more financial instruments, each said tenor associated with one of a plurality of buckets, said method comprising:

receiving at said computer system an initial available credit limit for each said bucket;

receiving at said computer system an initial overriding credit limit for each said bucket;

receiving at said computer system a signal associated with a trade action, said signal including a trade tenor and a trade amount, said trade action being associated with bucket (the $k^{th}$ bucket);

reducing said overriding credit limit for said $k^{th}$ bucket by said trade amount; and for each bucket$_i$ for i=1 to N, said computer system reducing said currently available credit limit in proportion to said trade amount multiplied by said initial available credit limit associated with buckets divided by said initial available credit limit associated with said $k^{th}$ bucket.

33. The method of claim 1, wherein said receiving an initial available credit limit for each said bucket comprises:

receiving a single monetary amount associated with one said bucket of said plurality of buckets, said single monetary amount defining the proportional draw down amount for said one bucket;

for each remaining bucket of said plurality of buckets, receiving a ratio to said single monetary amount, said initial available credit limit for each said bucket being determined by multiplying said ratio by said single monetary amount.

34. The method of claim 1, wherein said proportional draw down amount for each said bucket is expressed as a normalized amount.

35. The apparatus of claim 29 wherein said initial available credit limit is stored as a normalized total credit.

36. The apparatus of claim 30 wherein said received initial available credit limit is expressed as a normalized total credit.

37. A method, with the aid of a computer system, of tracking credit limits for a plurality of tenors of one or more financial instruments, each said tenor associated with one of a plurality of buckets, said method comprising:

receiving a proportional draw down amount associated with each of said buckets;

receiving a signal associated with a trade action, said signal including a trade tenor and a trade amount; and recalculating said proportional draw down amount for each said bucket by implementing a function expressed as $$M_i^{\alpha+1} = M_i^\alpha - (M_i^\alpha / M_k^\alpha) * X_k,$$

where $M_i^{\alpha+1}$ denotes the value of the proportional draw down for bucket i after $\alpha+1$ trades, and $X_k$ denotes the size of the trade for bucket k.

* * * * *